April 23, 1963 R. A. WYATT 3,086,625
CELLULAR CORE AND METHOD OF MAKING SAME
Filed March 19, 1959 2 Sheets-Sheet 1
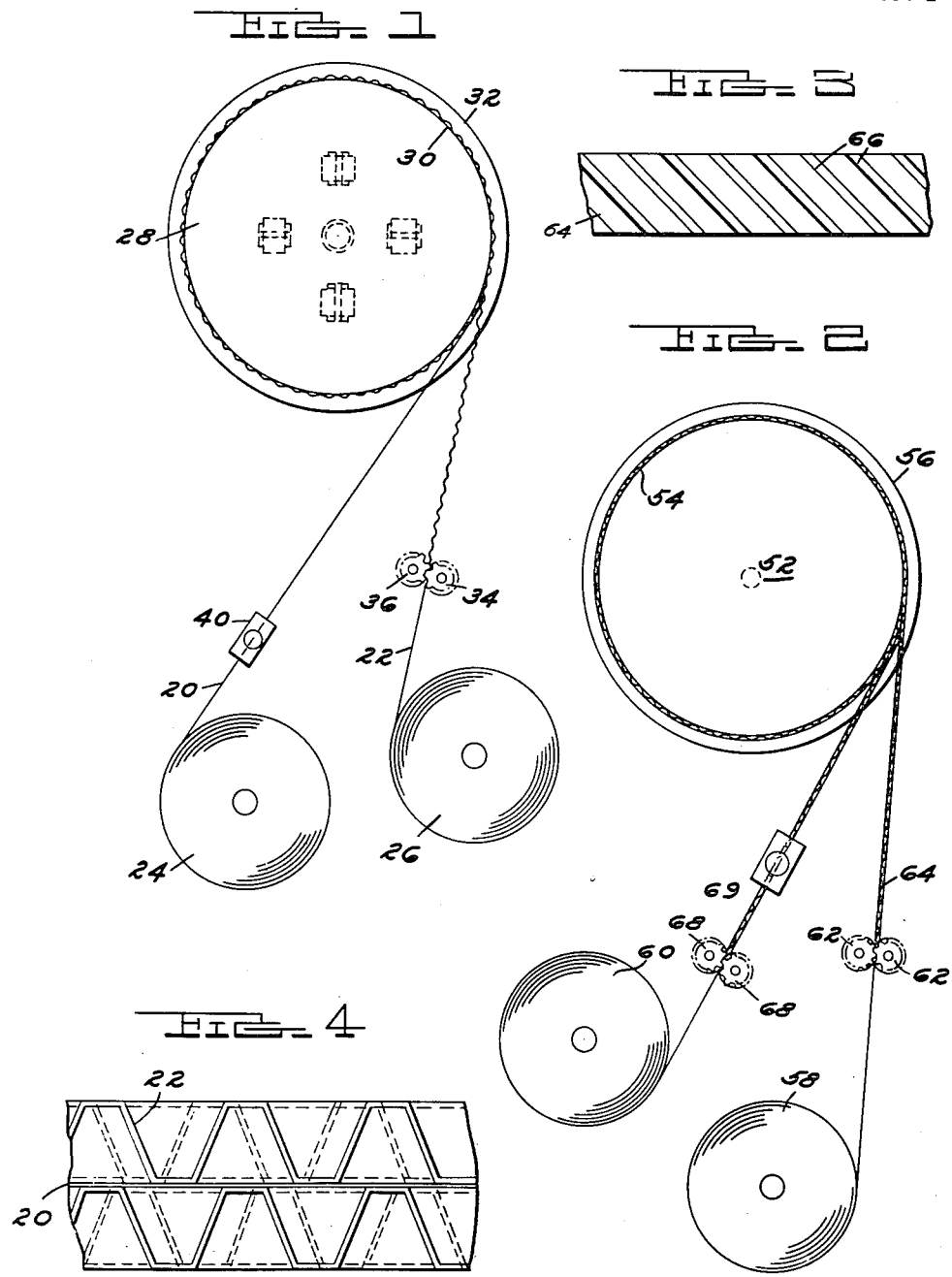
INVENTOR.
RAYMOND A. WYATT
BY
Burton & Parker
ATTORNEYS April 23, 1963  R. A. WYATT  3,086,625
CELLULAR CORE AND METHOD OF MAKING SAME
Filed March 19, 1959  2 Sheets-Sheet 2
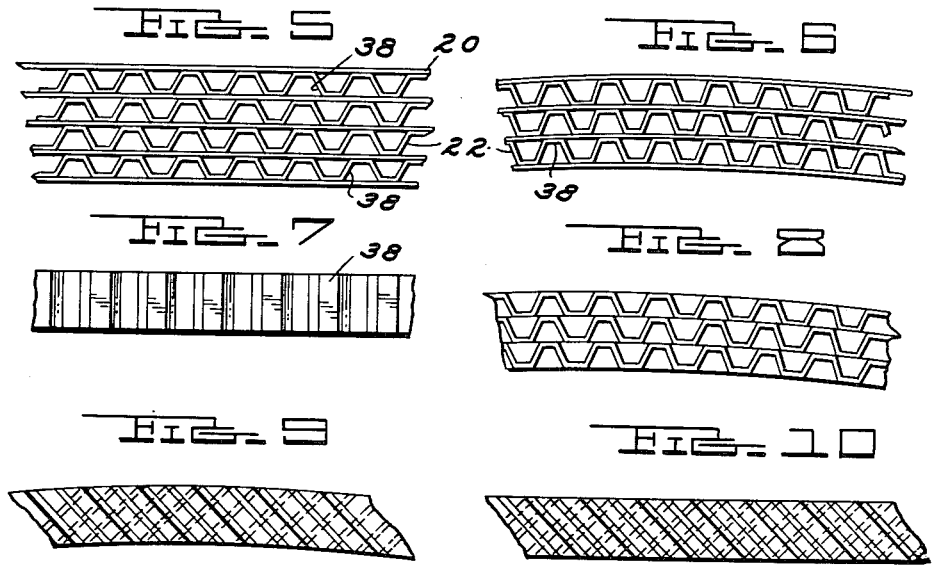
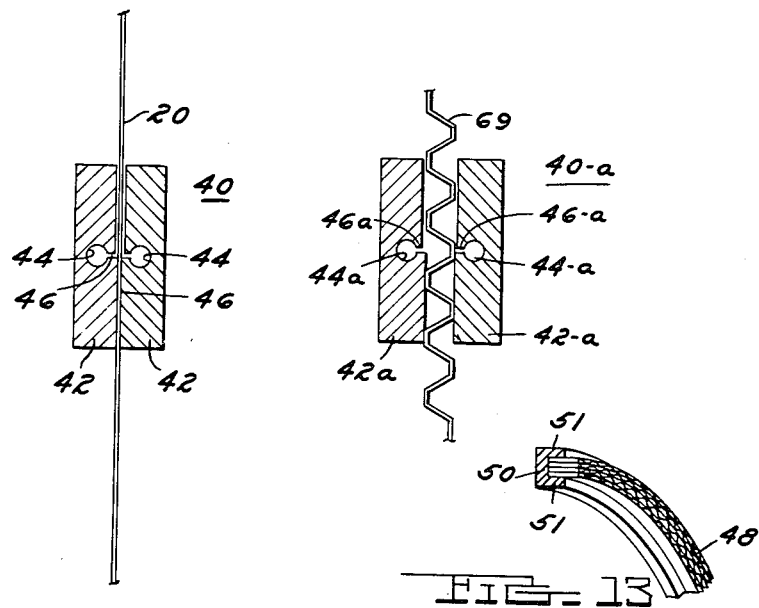
INVENTOR.
RAYMOND A. WYATT
BY
Burton & Parker
ATTORNEYS

United States Patent Office 3,086,625
Patented Apr. 23, 1963

3,086,625
CELLULAR CORE AND METHOD OF
MAKING SAME
Raymond A. Wyatt, St. Clair Shores, Mich., assignor to Triar, Inc., Madison Heights, Mich., a corporation of Michigan
Filed Mar. 19, 1959, Ser. No. 800,557
4 Claims. (Cl. 189—34)

This invention relates to an improved cellular core and to an improved process for fabricating the same.

An object is the provision of an improved cellular core which may be built up out of metal ribbon or the like into a core structure which comprises a multiplicity of small cells securely fastened together and which core may take the shape of a flat sheet or an arcuate sheet or be otherwise shaped as desired and which core is also of light weight and of strong and sturdy construction.

Another object is the provision of an improved cellular core as described in the preceding paragraph and wherein the core structure is built up out of a succession of ribbon-like layers or laminations so shaped and assembled together as to form an improved cellular core structure adapted to be used wherever such a core is desired for use.

Another object is the provision of an improved process whereby a cellular core structure of the character herein described may be rapidly and cheaply fabricated out of metal ribbon or the like so as to form an improved cellular core of great strength but light weight.

A further object is the provision of a process of the character set forth wherein a cellular core of a sheet-like form but annular shape may be quickly and economically fabricated with a minimum of hand labor.

A feature of this invention is that the core may be fabricated out of a plurality of metal ribbons, one or more of which may be transversely corrugated, and then such ribbons may be wound in a succession of coils upon a circular table or reel and the successive coils suitably secured together to form an integral annular sheet.

The core structure may be built up out of alternately disposed coils of corrugated and uncorrugated ribbon wherein the uncorrugated ribbon separates successive cores of corrugated ribbon so that the coils are maintained against nesting of their corrugations.

A particularly strong and economical structure may be formed of a plurality of corrugated ribbons so corrugated and so coiled together that corrugations of successive ribbons extend angularly with respect to each other and with respect to the linear edges of the ribbons themselves so that the corrugations of successive ribbons cross each other and thereby provide a strongly reinforced core structure at low cost.

Other objects, advantages, and meritorious features of the invention, both as to process and product, will more fully appear from the following description, claims, and accompanying drawing, wherein:

FIG. 1 is a schematic plan of one process of fabricating one embodiment of the invention;

FIG. 2 is a schematic plan of a similar process of fabricating a modification of the structure shown in FIG. 1;

FIG. 3 is a plan of a fragment of the corrugated ribbon shown in FIG. 2;

FIG. 4 is an edge elevation of successive coils of the assembled ribbons shown in FIG. 2;

FIG. 5 is an edge elevation of a fragment of a flat core structure fabricated as an embodiment of the structure shown in FIG. 1;

FIG. 6 is an edge elevation of a fragment of a core structure such as would result from the fabrication shown in FIG. 1;

FIG. 7 is a plan of a fragment of a section of the corrugated ribbon shown in FIG. 1;

FIG. 8 is an edge elevation of three coils of a cellular core as wound according to the illustration in FIG. 2;

FIG. 9 is a plan of a fragment of an elevation of a two-ply ribbon such as would result from the process illustrated in FIG. 2 provided the ribbon is wound upon its edge on the table;

FIG. 10 is a plan of a fragment of a two-ply ribbon as wound according to the process shown in FIG. 2;

FIG. 11 is a schematic illustration of the mechanism for applying adhesive to an uncorrugated strip of ribbon as shown in FIG. 1;

FIG. 12 is a schematic view of mechanism for applying adhesive to a corrugated strip of ribbon as shown in FIG. 2;

FIG. 13 is a fragment of a cellular core formed as herein set forth and mounted within a fragment of a supporting frame.

As above indicated, two modifications of the invention are illustrated in the figures of the drawing. The first modification is illustrated in FIGS. 1, 4, 5, 6, 7, and 11. The second modification is illustrated in FIGS. 2, 3, 8, 9, 10, and 12. In the first modification, two separate ribbons, which may be indicated as 20 and 22, are unwound from suitable rolls 24 and 26. These ribbons 20 and 22 are brought into laminating juxtaposition about a circular table or reel 28. This reel has an outer face which is stepped in that it exhibits a circumferential portion of minor diameter indicated as 30 adjacent to one side and about which ribbon may be wound. It also exhibits a circumferential portion of major diameter 32 which constitutes a shoulder or flange against which shoulder an edge of coils of ribbon wound about the circumference 30 abut. This shoulder therefore holds these coils in alignment, all as shown in FIG. 1. The table 28 may itself be suitably supported for rotation so that the two ribbons may be unwound from the rolls 24 and 26 and wound in successive alternate coils about the rotating table. This process may be carried out as a continuous procedure as herein described or successive individual coils may be each welded at its ends, and then another coil wound thereabout and in turn welded.

Suitable corrugating means in the form of corrugating rolls 34 and 36 may be provided. Such are schematically shown in FIG. 1. They may be suitably driven so as to corrugate the ribbon 22 transversely. These corrugations 38 extend perpendicularly to the linear edges of the ribbon as shown in FIG. 7. As shown in FIG. 1 a single turn of this corrugated ribbon may be wound about the table 28, then an uncorrugated ribbon 20 is interleaved so that the corrugations of successive linear sections of the ribbon 22 will be prevented from nesting into each other and will be held spaced apart by the uncorrugated alternating ribbon as shown in FIG. 4.

FIGS. 5 and 6 show this alternate disposition of the laminated uncorrugated ribbon 20 and corrugated ribbon 22 and wherein the corrugations 38 are shown as being prevented from nesting by the uncorrugated ribbon 20.

In order to secure the successive coils or laminations of the ribbons 20 and 22 together, the uncorrugated ribbon 20 may be passed through an adhesive applying device 40 as indicated in FIG. 1 and also as shown in FIG. 11. In FIG. 11 the device is shown in somewhat larger detail.

Suitable adhesive, which may be of any suitable cementitious character, such as suitable resinous compositions or the like, may be employed. These adhesive compositions may be of a character only to hold the coils together temporarily until they have been welded, brazed, or soldered together. On the other hand, such might constitute a permanent connection, all depending upon the character of the use to which the core was to be placed. The adhesive application means illustrated shows a pair of blocks indicated by the numeral 42 between which blocks the ribbon 20 is caused to pass. Each block is provided with a passageway 44 through which adhesive may be fed in any suitable manner. Each such passageway communicates by a slot 46 with the face of the block over which the ribbon 20 travels so that opposite faces of the ribbon may have adhesive spread thereover.

It will appear, therefore, that as the ribbons 20 and 23 are wound in successive alternate coils about the table 28 and the ribbon 20 is coated with adhesive, the resulting core will be of an annular shape and the successive coils will be secured together by the adhesive.

Such a cellular annular core might be mounted within an annular support or frame and brazed or soldered therein as desired. A fragment of such frame is illustrated in FIG. 13 and indicated as 50. The brazing or soldering might be carried out in any well known manner. The width of the ribbon from which the core is built up as shown in FIG. 13 is in excess of the width of the flange 51 of the frame so that the core projects above such flange. In such figure the core structure is indicated as 48 and the fragment of the frame within which it is mounted is indicated as 50.

If the coils of the core are secured together by adhesive which melts at a temperature well below the brazing temperature, it will be found that the brazing metal will migrate between the contact points of successive coils theretobefore occupied by adhesive coils and secure the coils together and will also secure the edges of the coils to the base of the annular frame. In use as an annular engine core, the blades of a rotor would sweep across the flat face of that portion of the cellular coil which projected beyond the flange of the frame.

The construction hereinabove described of FIGS. 1, 4, 5, 6, 7, and 11, represents one embodiment of the invention. It is the one wherein uncorrugated ribbon and corrugated ribbon are laminated in successive coils. In the second modification, being that of FIGS. 2, 3, 8, 9, 10, and 12, only corrugated ribbon is used.

In FIG. 2 a table similar to that shown in FIG. 1 is indicated as 52. It exhibits a portion of minor circumference 54 about which the ribbon is wound and a portion of major circumference 56 which constitutes a shoulder or flange against which the edges of the coils wound upon the portion 54 abut. The construction is similar to that in FIG. 1. The only difference from FIG. 1 is that in FIG. 2 there are two ribbons that are corrugated and wound together as hereinafter described instead of one corrugated and one uncorrugated ribbon being wound together.

The two ribbon coils are indicated as 58 and 60. The ribbon from coil 58 passes between corrugating rolls 62 as it is unwound from the roll 58. It then continues as a generally transversely corrugated ribbon 64 and is wound about the circular table 52. The corrugating rolls 62 are so formed that the corrugations 66, while extending transversely of the ribbon, do not extend perpendicularly with respect to the opposite linear edges. They extend at an angle other than 90 degrees with respect to such edges as shown in FIG. 3.

The ribbon which is unwound from the roll 60 passes between corrugating rolls 68 and extends as a corrugated ribbon 69 to the table 52 to be interleaved between successive coils of the corrugated ribbon 64. The corrugating rolls 68 are so formed that the corrugations of the ribbon 69 extend substantially perpendicularly with respect to the corrugations 66 of the ribbon 64. As a result, when these two ribbons are wound together, the one being interleaved between the successive coils of the other, their corrugations cannot nest together but cross each other and are adhesively secured together only at the nodes of the corrugations where they cross.

It will be seen, therefore, that in this modification the core is composed entirely of corrugated ribbon, that the two ribbons are similarly corrugated but with corrugations extending in opposite directions, and that the two corrugated ribbons which are laminated together have their corrugations crossing each other, and as a result a peculiarly strong and sturdy construction is provided at a minimum cost.

In FIG. 12 there is shown adhesive applying means similar to that shown in FIG. 11 but adapted for use with a corrugated ribbon rather than a plain ribbon. This adhesive applying means is shown schematically as being of the same form as illustrated in FIG. 11 wherein the means is indicated as 40a and comprises a pair of blocks 42a supported in spaced-apart relation to permit a corrugated ribbon 69 to be passed therebetween. Each of the blocks 42a has a passageway 44a through which adhesive may be fed. Each passageway 44a has a slot 46a leading therefrom to the face of the block over which the ribbon travels so that adhesive may be wiped therefrom by the nodes of the corrugations passing thereover.

The ribbons which are wound upon the table 52 as shown in FIG. 2 will form a cellular core of an annular shape but consisting entirely of corrugated ribbon adhesively secured together. Such a core may be placed within an annular frame or support as hereinbefore set forth in connection with the structure of FIG. 1 and as illustrated in FIG. 13. It may be secured in such supporting frame by brazing, soldering, welding, or the like in the manner hereinabove described. The only difference will be the difference resulting from the character of the cellular core itself.

In the annular cores which would result from the winding of the ribbons as described in connection with FIGS. 1 and 2, the cores extend transversely or parallel to the axis of the annular sheet, which would result from either the oepration shown in FIG. 1 or FIG. 2.

If it were desired to provide a cellular core wherein the inner circumference of the annulus were to be the face of an engine core over which a rotor blade was to revolve and wherein it were desired to have the cells extend radially, the process shown in FIG. 2 might be employed by winding the two corrugated ribbons about the circular table 52 with an edge of each ribbon abutting the minor circumference 54. Due to the fact that the ribbons are generally transversely corrugated, it would be possible to wind such in this manner about the circular table particularly if the diameter of the table is sufficiently large. The ribbons would contract along their inner circumferences and slightly expand along their outer circumferences to permit of this type of winding due to the fact that the ribbons are corrugated as they are. The process of FIG. 2 might therefore be employed to provide a cellular core-like annulus in which the cells extended generally radially. They would not extend as a true radius due to the fact that the cells of the two ribbons are angularly disposed but the direction would be generally radially.

What I claim is:
1. That process of fabricating a cellular core comprising, corrugating a metal ribbon into a linear succession of spaced corrugations extending generally transversely of the ribbon, coiling said corrugated ribbon upon itself and interleaving during the coiling thereof a second and uncorrugated ribbon between successive coils of the first ribbon building up an annular core structure, disposing a plurality of successive coils of said ribbons within an annular channel frame with one edge of each of the two ribbons of said succession of coils seated upon the bottom of the channel of the frame, and securing said edges of the two ribbons to the bottom of the channel of the frame and securing said two ribbons together at their crossing points.

2. A cellular annular sheet-like core wherein the cells which make up the core extend generally transversely of the sheet and wherein the core is composed of two metal ribbons interleaved and coiled together and with at least one of said ribbons provided with a linear succession of generally transversely extending corrugations the nodes of which are secured to the adjacent surfaces of the other ribbon at their crossing points and wherein the annular sheet-like core formed of the two ribbons is disposed within the channel of an annular frame which is channel shaped in cross section and the edges of the two ribbons that are seated upon the bottom of the channel are secured thereto.

3. A cellular annular sheet-like core as defined in claim 2 characterized in that each of the two ribbons is provided with a linear succession of generally transversely extending corrugations which corrugations are disposed at an angle other than a right angle with respect to the linear edges of either ribbon and wherein the two ribbons are so disposed within the channel of the annular frame that the nodes of the corrugations thereof cross each other and are secured together at said crossing points.

4. That process of fabricating a cellular core comprising, corrugating a metal ribbon into a linear succession of spaced corrugations extending generally transversely of the ribbon but at an angle other than a right angle with respect to the linear edge of the ribbon, coiling said corrugated ribbon upon itself and interleaving during said coiling between successive coils thereof a second corrugated ribbon wherein the corrugations also extend generally transversely of the ribbon and at an angle other than a right angle with respect to a linear edge of the ribbon and at an angle with respect to the corrugations of the first ribbon, and securing the two ribbons together at the crossing points of their corrugations, whereby the corrugations of the two ribbons cross each other in successive coils building up an annular core and are secured together at said crossing points of their corrugations, and characterized in that a plural number of said coils of ribbon are disposed within the channel of an annular channel frame with an edge of each coil seated upon the bottom of the channel of the frame and said plurality of coils are secured along their edges which rest upon the bottom of the channel frame to said bottom of the frame.

References Cited in the file of this patent
UNITED STATES PATENTS

| | | |
|---|---|---|
| 520,366 | Leaver | May 22, 1894 |
| 765,412 | Budwig | July 19, 1904 |
| 1,519,694 | Muessman | Dec. 16, 1924 |
| 2,423,870 | Blessing | July 15, 1947 |
| 2,726,051 | Deichert | Dec. 6, 1955 |
| 2,731,713 | Schaefer | Jan. 24, 1956 |